Patented Apr. 24, 1951

2,550,047

UNITED STATES PATENT OFFICE 2,550,047

PRINTING COLORS

André Henri Victor Durr, Paris, René François R. Wendling, Creil, and Jean Leopold Richard Gardedieu, Villers St. Paul, France, assignors to Societe Anonyme de Matieres Colorantes et Produits Chimiques Francolor, Paris, France, a corporation of France No Drawing. Application August 5, 1947, Serial No. 766,452. In France January 15, 1941

Section 1, Public Law 690, August 8, 1946
Patent expires January 15, 1961

5 Claims. (Cl. 260—22)

It is known that paints can be prepared by grinding emulsions of siccative glycerophthalic resins in water with pigments; the decorative effects resulting from the use of such colours for printing textiles are not fast to washing and rubbing.

The object of the present invention is to provide a method which makes it possible to obtain new printing colours which do not show this drawback, this method being characterized by the fact that a siccative alkyd resin is ground with a pigment without adding any solvent of the said resin and that the so obtained pigmented enamel is emulsified in water. While according to the above mentioned known method the pigment was ground with an emulsion of resin, according to the present invention the grinding of the pigment with the siccative alkyd resin is carried out in the first place. This grinding is operated by submitting the mixture of resin and pigment to an intensive mechanical working in the absence of solvent until the pigment is sufficiently dispersed in the resin; this mechanical working can be carried out, for instance, in a calender. The dispersion of pigment in resin is then emulsified in water. The pigment is thus perfectly covered by the resin so that decorative effects are obtained which are very fast to washing and rubbing.

The pigments which are used can be of organic or inorganic character.

The siccative alkyd resins used for carrying out the invention can be prepared according to any known method; they should contain at least radicals of a polybasic acid, of a polyalcohol and of a fatty acid.

The polyacids may be, for instance, phthalic acid, maleic acid, succinic acid, citric acid or mixtures of such acids.

The polyalcohols may be glycerin, glycol, pentaerythrite, thiodiglycol, butanediols or mixtures of such compounds.

The fatty acids or their mono-, di- or triglycerides which can be used for manufacturing the said resins are, as a rule, all those which, in the art of making paints, lacquers and varnishes, are known as having siccative properties but preferably those which do not become yellow under the influence of air and light such as the derivatives of soya bean oil or dehydrated castor oil. Soya bean oil is particularly recommended for the following reason:

When a colour is printed which is formed by an emulsion in water of a pigmented alkyd resin the emulsion is broken: the water impregnates the fibre and the pigmented alkyd resin remains on the surface of the latter. During the drying operation the water escapes from the fibre and passes through the resin film which oxidizes and will further oxidize afterwards according to a process which can be designated under the name of fixing process. If, during the whole time of removal of the water the alkyd film remains sufficiently plastic the subsequent fixing of the latter causes on the surface of the fibre the formation of a smooth and homogeneous film; if, on the contrary, the film dries too quickly, the removal of the water crackles the film of pigmented resin and the fibre is covered, after fixing, with a more or less spongy coating; it is easy to understand that, under these conditions, a print is obtained which is less resistant to rubbings than the prints with a smooth and homogeneous film.

Thus, it results therefrom that in order to obtain the maximum fastnesses it is necessary either to adjust the conditions of drying and fixing or to choose resin types giving a plastic film during the whole time of the removal of the water irrespectively of the working conditions. It is this latter result which has been obtained by resorting to alkyd resins drying slowly in depth in the air, of the long oil type and, more particularly, to the alkyd resins showing these features and prepared starting from soya bean oil.

The emulsion in water of the pigmented enamel obtained as explained above can be obtained with one of the emulsifying agents the use of which is known in the art, for instance water soluble cellulosic derivatives such as methylcellulose, ethylcellulose and oxy-ethylcellulose; polyvinylic alcohol, partially saponified and water soluble polyvinylic acetates, water soluble reaction products of ethylene oxide with water insoluble organic substances containing one reactive atom of hydrogen, casein, salts of carboxylic or sulphonic acids, sulphuric esters of high molecular weight. In order to facilitate the emulsion auxiliary products such as ammonia, volatile amines, triethanolamine may be added.

The so obtained colours are easily printed. The printed fabrics are then dried at temperatures which may vary from the ordinary temperature to 200° C., the drying being, of course the quicker the higher the temperature.

The obtained decorative effects are very fast to washing and rubbing and the printing cylinders can be easily cleaned after the work through washing with warm water.

When soya bean oil alkyd resins are used the obtained products make it possible to dry and to fix the prints under the broadest conditions; a hanging out of 20 to 48 hours will be sufficient for giving prints having a good fastness to rubbing and to alkaline soaping; it is possible immediately after printing to proceed with a drying of a few minutes in the drying-room at temperatures of 60 to 100° C. for removing the water and, before proceeding to the fixing operation, to roll or pile up the printed fabric.

Through the method according to the present invention it is possible directly to obtain printing colours which are ready for use. But it is also possible, by conveniently choosing the proportions of the substances which are used, to prepare by the same method printing colours under the form of concentrated pastes which are suitable for being brought to the desired viscosity at the moment of the use through an addition of water. Owing to their reduced volume the so obtained concentrated pastes offer the advantage that they can be conveyed and kept more easily. Furthermore, they make it possible for the printer to prepare printing pastes having the exactly desired fluidity.

The printing colours manufactured according to the present invention may receive an addition of siccatives in use in the art of making paints and varnishes and this addition can be carried out either during the grinding operation or during the dilution with water.

Example I 100 parts of glycero-phthalic resin basically composed of a mixture of soya bean oil and dehydrated castor oil having a global composition corresponding to 75% of oil are ground in a cylinder grinding mill (optionally heated) with 10 parts of "Monastral BS Blue" so as to obtain a ground mass having substantially the following constitution:

| | Parts |
|---|---|
| Resin | 100 |
| Monastral BS Blue | 10 |

This pigmented enamel is added little by little to a solution of:

| | Parts |
|---|---|
| Methyl cellulose | 15 |
| Triethanolamine | 5 |
| Water | 135 |

A concentrated paste is thus obtained the viscosity of which is adjusted at the moment of use through an addition of the necessary quantity of water.

After printing the fabric is dried during 5 minutes at 60–100° C. for removing the water and then piled or rolled up.

The fixing can be obtained either by hanging up during 24 hours in free air or by passing through a drying room. By way of indication it may be proceeded with a passage through a drying room during 20 minutes at 120° C. or 6 minutes at 160° C.

Under these conditions, prints are obtained which show good fastenesses to boiling alkaline soaping and to rubbing.

Example II 10 parts of "Monastral Green" are ground in a cylinder grinding mill up to a sufficient fineness with 100 parts of glycerophthalic resin of a small viscosity, basically composed of soya bean oil and containing 75 parts of oil and 25 parts of glyptal.

On the other hand, a 8.25% aqueous suspension of bentonil C (a variety of bentonite) is prepared which is passed through a colloidal grinding mill or abandoned to maturing during 8 days.

150 parts of the colloidal suspension of bentonite receive an addition of 5 parts of methanolamine and are heated to + 80° C.

The ground pigment heated to + 80° C. is poured thereinto under a strong stirring in about 15 minutes, 50 parts of water being then added after homogenization.

The stirring is maintained until cooling.

The so obtained colour is printed and dried under the same conditions as those which are described in Example I and after drying it gives prints showing a good fastness to rubbing and washing.

What we claim is:

1. A method for printing textile and producing decorative effects fast to wasing and rubbing which consists in applying on textile fabrics colours obtained by grinding a long oil siccative glycerophthalic resin containing a member of the group consisting of soya bean oil, and dehydrated castor oil, with a pigment without any addition of a solvent of the resin, and then in emulsifying the so obtained pigmented enamel in water by means of an emulsifying agent.

2. A method according to claim 1 in which the resin contains about 25% of glycerophthalic condensation product and about 75% of oil.

3. A method for printing textile and producing decorative effects fast to washing and rubbing which consists in applying on textile fabrics colours obtained by grinding a long oil siccative glycerophthalic resin containing soya bean oil with a pigment without any addition of a solvent of the resin, and then in emulsifying the so obtained pigmented enamel in water by means of an emulsifying agent.

4. A method for printing textile and producing decorative effects fact to washing and rubbing which consists in applying on textile fabrics colours obtained by grinding a long oil siccative glycerophthalic resin containing dehydrated castor oil with a pigment without any addition of a solvent of the resin, and then in emulsifying the so obtained pigmented enamel in water by means of an emulsifying agent.

5. A method for printing textile and producing decorative effects fast to washing and rubbing which consists in applying on textile fabrics colours obtained by grinding a long oil siccative glycerophthalic resin containing a mixture of soya bean oil and dehydrated castor oil with a pigment without any addition of a solvent of the resin, and then in emulsifying the so obtained pigmented enamel in water by means of an emulsifying agent.

ANDRÉ HENRI VICTOR DURR.
RENÉ FRANÇOIS R. WENDLING.
JEAN LEOPOLD RICHARD GARDEDIEU.

REFERENCES CITED

The following references are of record in the file of this patent:

UNITED STATES PATENTS

| Number | Name | Date |
|---|---|---|
| 1,998,744 | Ubben | Apr. 23, 1935 |
| 2,356,794 | Peiker | Aug. 29, 1944 |

FOREIGN PATENTS

| Number | Country | Date |
|---|---|---|
| 599,211 | Germany | June 27, 1934 |
| 227,782 | Switzerland | Sept. 16, 1943 |